(12) United States Patent
Alam et al.

(10) Patent No.: US 9,226,208 B2
(45) Date of Patent: Dec. 29, 2015

(54) APPARATUS AND METHODS FOR RESOLVING INCOMPLETE MESSAGE CONTENT IN NETWORKS

(71) Applicant: Apple Inc., Cupertino, CA (US)

(72) Inventors: Muhammad Adeel Alam, San Jose, CA (US); Giri Prassad Deivasigamani, San Jose, CA (US); Srinivasan Vasudevan, Sunnyvale, CA (US); Gaurav Nukala, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 13/621,770

(22) Filed: Sep. 17, 2012

(65) Prior Publication Data

US 2013/0267232 A1 Oct. 10, 2013

Related U.S. Application Data

(60) Provisional application No. 61/621,397, filed on Apr. 6, 2012.

(51) Int. Cl.
*H04W 36/00* (2009.01)
*H04W 36/14* (2009.01)

(52) U.S. Cl.
CPC .......... *H04W 36/14* (2013.01); *H04W 36/0083* (2013.01)

(58) Field of Classification Search
CPC ..... H04W 36/36; H04W 36/30; H04W 36/34; H04W 36/14; H04W 36/0083
USPC ................... 455/436–437, 418, 423
See application file for complete search history.

(56) References Cited

U.S. PATENT DOCUMENTS

| 5,953,324 | A | * | 9/1999 | Adachi | 370/331 |
| 2009/0274301 | A1 | * | 11/2009 | Otte et al. | 380/270 |
| 2010/0184438 | A1 | * | 7/2010 | Wu | 455/436 |

OTHER PUBLICATIONS

ETSI TS 136 523-1 V9.4.0 (Jul. 2011) LTE; Evolved Universal Terrestrial Radio Access (E-UTRA) and Evolved Packet Core (EPC); User Equipment (UE) conformance specification; Part 1: Protocol conformance specification (3GPP TS 36.523-1 version 9.4.0 Release 9).*

* cited by examiner

*Primary Examiner* — Marcos Torres
(74) *Attorney, Agent, or Firm* — Downey Brand LLP

(57) ABSTRACT

Methods and apparatus for resolving incomplete message content in networks. Various embodiments of the present disclosure are directed to correction and recovery of incomplete measurement report configuration messages within a Long Term Evolution (LTE) network. Specifically, within certain LTE networks, existing messaging may be incomplete in regards to various nearby ancillary networks, but still sufficient with regards to measurement requirements of the LTE network itself. Since the mobile device can continue operation within the LTE network, the mobile device can safely ignore or correct the measurement report configuration message.

20 Claims, 5 Drawing Sheets

APPARATUS AND METHODS FOR RESOLVING INCOMPLETE MESSAGE CONTENT IN NETWORKS

PRIORITY

This application claims priority to U.S. Provisional Patent Application Ser. No. 61/621,397 filed Apr. 6, 2012 and entitled "APPARATUS AND METHODS FOR RESOLVING INCOMPLETE MESSAGE CONTENT IN NETWORKS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to operation within heterogeneous wireless systems such as, for example, hybrid network operation in which client devices can communicate using any one of several networks. More particularly, in one exemplary embodiment, methods and apparatus for resolving incomplete message content in networks are disclosed.

2. Description of Related Technology

A cellular network operator provides mobile telecommunications services to the public via a network infrastructure of e.g., cellular base stations (BS), base station controllers, infrastructure nodes, etc. There are a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies.

Generally, cellular devices automatically select the most capable technology available; thus, a UE that is capable of both LTE and UMTS will select LTE networks when available, and fall back to UMTS networks (which have better coverage) when LTE networks are not available. To support inter-frequency, intra-frequency, and inter-Radio Access Technology (inter-RAT) type handovers, cellular devices must provide measurement report data according to specific trigger events. For example, cellular devices provide a wide range of information to its serving network regarding both the current signal strength of the serving cell, its neighboring cells, and alternative available networks. Based on this measurement information, the serving cell can issue proper commands to the cellular device regarding appropriate operation.

Existing cellular networks require specific measurement reports for such handover operation. For LTE inter-frequency/intra-frequency measurements, the UE must provide measurements for the serving cell, the listed cells, and any detected cells. Additionally, where the UE is UMTS-capable, and UMTS networks exist (inter-RAT UMTS Terrestrial Radio Access (UTRA)), the UE must provide measurements regarding a designated list of cells. If the UE is Global Standards for Mobile Communications (GSM)/Enhanced Data Rates for GSM Evolution (EDGE) (GERAN) capable, and GSM/EDGE networks exist (inter-RAT GERAN), the UE must provide measurements regarding any detected cells. Similarly, if the UE is Code Division Multiple Access (CDMA) 2000 capable, and CDMA 2000 networks exist (inter-RAT CDMA 2000), the UE must provide measurements regarding a designated list of cells.

Unfortunately, within certain types of wireless networks (such as e.g., Long Term Evolution (LTE) networks), existing messaging may be incomplete in regards to various nearby ancillary networks, but still sufficient with regards to measurement requirements of the (LTE) network itself. Existing devices may handle incomplete messaging in unpredictable ways or produce undesirable outcomes. For example, in one exemplary scenario described hereinafter, a malformed message can result in a Radio Link Failure (RLF) for an ancillary network, which causes the termination of the connection between the UE and its primary network, even though the RLF does not reflect a problem with the actual LTE handover. In other examples, a malformed message can "hang" a device state (rendering the device temporarily unusable, etc.).

Hence, there is a need for improved methods and apparatus to address the foregoing issues regarding incomplete information for, inter alia, inter/intra-frequency or inter-RAT handovers, thereby increasing the robustness of operation of the network and associated mobile devices.

SUMMARY

The present disclosure provides, inter alia, improved apparatus and methods for resolving incomplete message content in networks.

A mobile wireless apparatus configured to resolve incomplete message content regarding a second network, where the second network is ancillary to operation on the first network is disclosed. In one embodiment, the mobile wireless apparatus includes: a first wireless interface configured to communicate with at least the first wireless network; a second wireless interface configured to communicate with the second wireless network; and logic in data communication with at least the first wireless interface, the logic configured to: validate a message including one or more operations, a first condition relating to the first network, and a second condition relating to at least the second network; when the second condition is invalid and the first condition relating to the first network is valid, perform the one or more operations regardless of the second condition.

In one variant, the message further includes (i) one or more portions which relate to a target cell, and (ii) information which is not directly related to the one or more operations.

In a second variant, the first wireless network includes a long term evolution (LTE) enabled network, and the second condition includes information for an inter radio access technology (inter-RAT) handover. In one such variant, the one or more operations includes an LTE inter- or intra-frequency handover operation.

In a third variant, the logic is further configured to, when the determination indicates that the first condition is not sufficient, modify the first condition so as to render the first condition sufficient. For example, where the message is at least in part incorrectly formatted, the modification of the first condition includes an attempt to correct a format of the message. In another such example, where the message is at least in part incomplete, the modification includes an attempt to add missing information from another source. In some cases, the message does not contain complete information for one or more neighbor cells, and the another source includes a system information block (SIB) provided by the first network. In other scenarios, the message does not contain complete information for one or more neighbor cells, and the another source includes historical values for the one or more neighbor cells.

In a fourth variant, the validation of the message includes a check of one or more checksum elements for one or more portions of the message.

A method for resolving incomplete message content in networks is disclosed. In one embodiment, the method includes: validating a message including one or more operations, a first condition relating to a first network, and a second condition relating to one or more other ancillary networks; if the message is valid, performing the one or more operations; otherwise if the message is invalid, determining if the first condition relating to the first network is complete; and if the first condition relating to the first network is complete, performing the one or more operations, and ignoring the second condition relating to the one or more other ancillary networks.

In one variant, the first and one or more ancillary networks include cellular networks, and the message further includes (i) one or more portions which relate to a target cell, and (ii) information which is not directly related to the one or more operations.

In a second variant, the first network includes a long term evolution (LTE) enabled network, and the message includes an rrcConnectionReconfiguration message.

In a third variant, the one or more operations includes an LTE inter- or intra-frequency handover operation.

A method for resolving incomplete message content in networks is disclosed. In one embodiment, the method includes: validating a message including one or more operations, a first condition relating to a first network, and a second condition relating to one or more other ancillary networks; if the message is valid, performing the one or more operations; otherwise if the message is invalid, determining if the first condition relating to the first network is sufficient; and if the first condition relating to the first network is complete, performing the one or more operations, and substituting a default information for the second condition relating to the one or more other ancillary networks.

A computer readable non-transitory apparatus is disclosed. In one embodiment, the computer readable non-transitory apparatus includes a plurality of instructions configured to, when executed on a processing device: perform a validation check of a message including one or more operations, first information relating to a first network, and second information relating to one or more other second networks; when the check indicates that the message is valid, perform the one or more operations; when the check indicates that the message is invalid, determine that the first information relating to the first network is complete, and based at least in part on the determination, perform only the one or more operations, and not utilize the second information.

In one variant, the computer readable non-transitory apparatus includes: a mass storage device of a mobile wireless user device having first and second air interfaces configured to communicate with the first network and the one or more second networks, respectively; and the processing device.

In another variant, the one or more operations includes a inter- or intra-frequency handover operation within the first network.

A method of operating a mobile wireless device within a first network so as to increase its robustness to messaging errors is disclosed. In one embodiment the method includes: receiving a message from a network entity of the first network indicating at least one operation to be performed within the first network; evaluating the message for sufficiency; when the evaluating indicates that the message is not sufficient, invoking at least one remedial process to render the message sufficient; and when the message has been rendered sufficient by the at least one remedial process, performing the at least one operation.

A wireless mobile user apparatus is disclosed. In one embodiment, the wireless mobile user apparatus includes: a first air interface for communication via a first wireless technology; a second air interface for communication via a second wireless technology; processing logic in communication with at least the first air interface and configured to: receive a message from a network entity via the first air interface, the message indicating at least one operation to be performed via the first air interface; evaluate the message for sufficiency according to a prescribed protocol; when the evaluation indicates that the message is not sufficient, invoking at least one remedial process to render the message sufficient; and when the message has been rendered sufficient by the at least one remedial process, performing the at least one operation; wherein at least the evaluation and invocation of the at least one remedial process cooperate to prevent failure to perform the at least one operation due to the insufficiency of the message, thereby enhancing robustness of the user apparatus.

A method for resolving incomplete message content (such as for a message sent over a network) is disclosed. In one embodiment, the method includes: validating a message including one or more operations, a first condition relating to a first network, and a second condition relating to one or more other ancillary networks; and if the message is valid, performing the one or more operations. In one variant, if the message is invalid, the method further includes determining if the first condition relating to the first network is complete; and if the first condition relating to the first network is complete, performing the one or more operations, and ignoring the second condition relating to the one or more other ancillary networks.

In another embodiment, the method includes: validating a message including one or more operations, a first condition relating to a first network, and a second condition relating to one or more other ancillary networks; and if the message is valid, performing the one or more operations. In one variant, if the message is invalid, the method further includes determining if the first condition relating to the first network is complete; and if the first condition relating to the first network is complete, performing the one or more operations, and substituting a default information for the second condition relating to the one or more other ancillary networks.

An apparatus for resolving incomplete message content is disclosed. In one embodiment, the apparatus is a mobile device such as a smartphone or tablet computer.

A computer-readable storage apparatus is disclosed. In one embodiment, the apparatus includes a storage medium having at least one computer program stored thereon, the at least one program being configured to, when executed: validate a message including one or more operations, a first condition relating to a first network, and a second condition relating to one or more other ancillary networks; and if the message is valid, perform the one or more operations. Otherwise, if the message is invalid, the method determines if the first condition relating to the first network is complete; and if the first condition relating to the first network is complete, performs the one or more operations, and ignores the second condition relating to the one or more other ancillary networks.

In another embodiment, the apparatus includes a storage medium having at least one computer program stored thereon, the at least one program being configured to, when executed: validate a message including one or more operations, a first condition relating to a first network, and a second condition relating to one or more other ancillary networks; if the message is valid, perform the one or more operations; otherwise if the message is invalid, determine if the first condition relating to the first network is complete; and if the first condition relating to the first network is complete, perform the one or more operations, and substitute a default information for the second condition relating to the one or more other ancillary networks.

Other features and advantages of the present disclosure will immediately be recognized by persons of ordinary skill in the art with reference to the attached drawings and detailed description of exemplary embodiments as given below.

Figure 1:
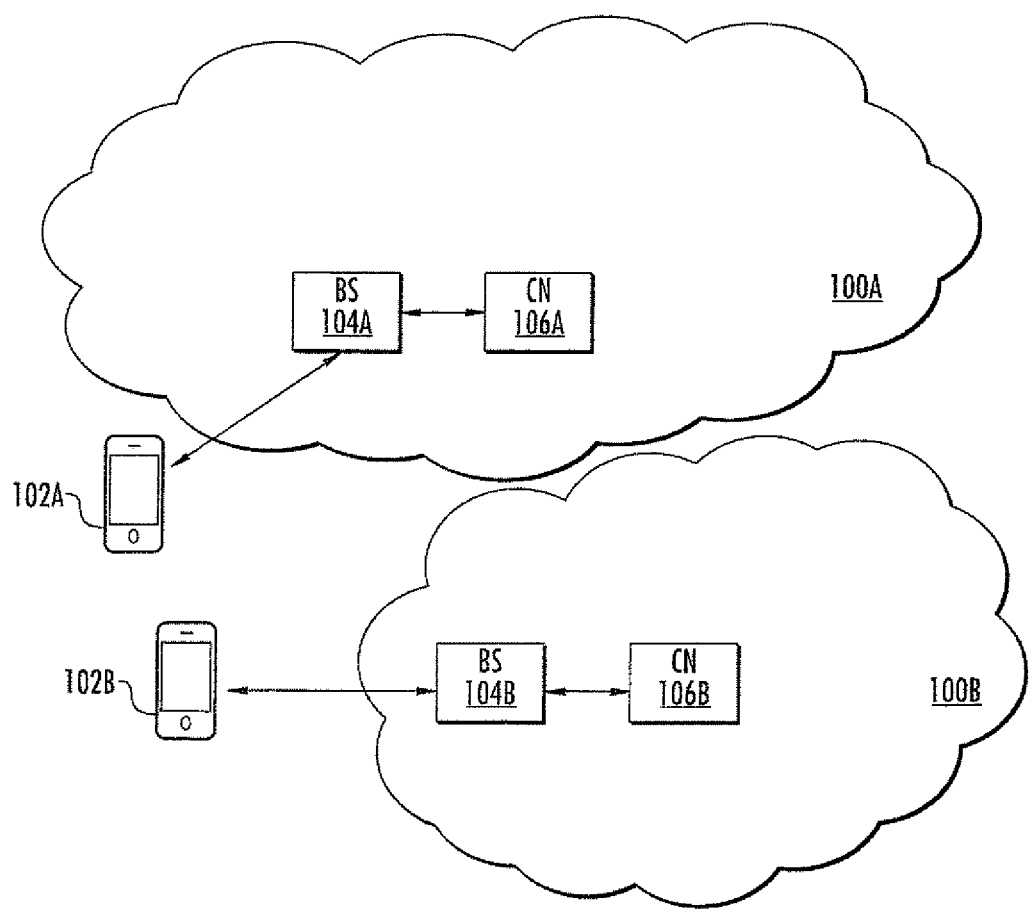
FIG. 1 is a logical block diagram illustrating an exemplary cellular network system.

All Figures © Copyright 2012 Apple Inc. All rights reserved.

DETAILED DESCRIPTION

Reference is now made to the drawings, wherein like numerals refer to like parts throughout.

Overview

To support inter-frequency, intra-frequency, and inter-Radio Access Technology (inter-RAT) type handovers, cellular devices must provide measurement report data according to specific trigger events. For example, cellular devices provide a wide range of information to its serving network regarding both the current signal strength of the serving cell, its neighboring cells, and alternative available networks. Based on this measurement information, the serving cell can issue proper commands to the cellular device regarding appropriate operation.

Unfortunately, within certain Long Term Evolution (LTE) networks, existing messaging may be incomplete in regards to various nearby ancillary networks, but still sufficient with regards to measurement requirements of the LTE network itself. Since the mobile device can continue operation within the LTE network, various embodiments are directed to mitigating and/or correcting for incomplete messages.

In one scenario, a client device is connected to a first network; during operation, the first network instructs the client device to perform one or more operations according to a message containing at least a first condition relating to a first network, and a second condition relating to one or more other ancillary networks. For example, in one exemplary embodiment, a LTE network instructs a UE to perform LTE inter-frequency/intra-frequency measurements and execute a handover, via an rrcConnectionReconfiguration message, where the rrcConnectionReconfiguration includes event conditions for the LTE network, and ancillary information relating to one or more other inter-RAT networks (e.g., UMTS, GERAN, CDMA 2000, etc.).

DETAILED DESCRIPTION OF EXEMPLARY EMBODIMENTS

Exemplary embodiments are now described in detail. While these embodiments are primarily discussed in the context of Long Term Evolution (LTE), and Universal Mobile Telecommunications Systems (UMTS) cellular networks, it will be recognized by those of ordinary skill that the present disclosure is not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM), General Packet Radio Service (GPRS), Code Division Multiple Access (CDMA) 2000 1X, CDMA 1X EVDO (Evolution Data Optimized). In fact, the various principles described herein are useful in combination with any network (cellular, wireless, wireline, or otherwise) that can benefit from resolving incomplete messaging content in networks.

Cellular Networks—

In the following discussion, an exemplary cellular radio system is described that includes a network of radio cells each served by a transmitting station, known as a cell site or base station (BS). The radio network provides wireless communications service for a plurality of mobile station (MS) devices. The network of BSs working in collaboration allows for wireless service which is greater than the radio coverage provided by a single serving BS. The individual BSs are connected to a Core Network, which includes additional controllers for resource management and is in some cases capable of accessing other network systems (such as the Internet, other cellular networks, etc.).

FIG. 1 illustrates two exemplary cellular networks 100, with client devices 102, operating within the coverage of Radio Access Networks (RAN) provided by a number of base stations (BSs) 104. Each Radio Access Network (RAN) is the collective body of base stations and associated network entities that are controlled by a Mobile Network Operator (MNO). The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smart phones (such as for example an iPhone™ manufactured by the Assignee hereof), personal computers (PCs) and minicomputers, whether desktop, laptop, or otherwise, as well as mobile devices such as handheld computers, PDAs, personal media devices (PMDs), tablet computers such as the exemplary iPad™ device manufactured by the Assignee hereof, or any combinations of the foregoing.

As shown in FIG. 1, each RAN is coupled to a Core Network 106 of the MNO e.g., via broadband access. The Core Network provides both routing and service capabilities. For example, a first client device connected to a first base station can communicate with a second client device connected to a second base station, via routing through the Core Network. Similarly, a client device can access other types of services e.g., the Internet, via the Core Network. The Core Network performs a wide variety of functions, including without limitation, authentication of client devices, authorization of client devices for various services, billing client devices for provisioned services, call routing, etc.

As a brief aside, cellular networks are owned and operated by a Mobile Network Operator (MNO). Typically, a MS is used in a so-called "home network"; the MS's home network is operated by the MNO and has the information necessary to authenticate and provision service to the MS (e.g., cryptographic keys used for authentication, service agreements, billing information, etc.). However, the MS may "roam" outside of the home network; accordingly, so-called "roaming" access refers to the set of services that are provided by a "visited network" with which the client device is not associated. Visited networks are typically operated by a different MNO than the MNO that a mobile device is associated with, however this is not always true (e.g., due to business arrangements, legal regulation, etc.). Roaming services are negotiated between MNOs to provide reciprocal service agreements to improve service coverage for their subscriber populations, respectively. For example, MNOs typically negotiate roaming relationships with other MNOs in different countries to enable accessibility of voice, data and other supplementary services for their subscribers when they travel internationally.

Inter-Frequency/Intra-Frequency/Inter-RAT Handover Operation—

Within the context of the exemplary cellular network of FIG. 1, a so-called "handover" describes the transfer of a MS connection from one BS to another BS. Efficient handover operation enables an MS to freely move from BS to BS, without a loss in coverage. Several types of handover operations are common within the related arts: (i) inter-frequency handover, intra-frequency handover, and (iii) inter-Radio Access Technology (inter-RAT) handover.

Inter-frequency/intra-frequency handovers describe a handover from a first BS to a second BS of the same Radio Access Technology (RAT). The primary distinction between inter-frequency and intra-frequency handover is the frequency of interest; specifically, in intra-frequency handover the operating frequency remains the same throughout the handover whereas for inter-frequency handover the operating frequency changes. It should be noted that inter-frequency/intra-frequency handovers can be performed between different Radio Access Networks (RAN) (of the same RAT) operated by different MNOs.

Inter-RAT handovers describe a handover from a first BS to a second BS of different Radio Access Technologies (RAT). Unlike inter-frequency/intra-frequency handovers, the MS must switch to a different RAT (i.e., change modem operation) to complete the handover. Common examples of LTE inter-RAT operation include, without limitation: UMTS Terrestrial Radio Access (inter-RAT UTRA), Global Standards for Mobile Communications (GSM)/Enhanced Data Rates for GSM Evolution (EDGE) (inter-RAT GERAN), Code Division Multiple Access (CDMA) 2000 (inter-RAT CDMA 2000).

To support inter-frequency, intra-frequency, and inter-RAT type handovers, the MS must provide measurement report data according to specific trigger events. For example, if the reception quality of a first BS drops, while the reception quality of a second BS increases, the MS will report the change in quality to its serving network. The serving network can issue a handover command, which causes the MS to perform the handover. Generally, the specific trigger events are dictated by the MNO and provided in messaging to the mobile device.

For LTE networks, the various trigger event conditions for reporting measurement reports are specified under the 3rd Generation Partnership Project (3GPP) Technical Specification (TS) Group Radio Access Network Evolved Universal Terrestrial Radio Access (E-UTRA) Radio Resource Control (RRC) Protocol specification (3GPP TS 36.331 V10.5.0, published Mar. 14, 2012, incorporated by reference in its entirety, hereinafter "3GPP TS 36.331"). These measurement reports are listed in TABLE 1.

TABLE 1

| EVENT A1 | 5.5.4.2 | SERVING BECOMES BETTER THAN THRESHOLD |
| EVENT A2 | 5.5.4.3 | SERVING BECOMES WORSE THAN THRESHOLD |
| EVENT A3 | 5.5.4.4 | NEIGHBOUR BECOMES OFFSET BETTER THAN PCELL |
| EVENT A4 | 5.5.4.5 | NEIGHBOUR BECOMES BETTER THAN THRESHOLD |
| EVENT A5 | 5.5.4.6 | PCELL BECOMES WORSE THAN THRESHOLD1 AND NEIGHBOUR BECOMES BETTER THAN THRESHOLD2 |
| EVENT A6 | 5.5.4.6a | NEIGHBOUR BECOMES OFFSET BETTER THAN SCELL |
| EVENT B1 | 5.5.4.7 | INTER RAT NEIGHBOUR BECOMES BETTER THAN THRESHOLD |
| EVENT B2 | 5.5.4.8 | PCELL BECOMES WORSE THAN THRESHOLD1 AND INTER RAT NEIGHBOUR BECOMES BETTER THAN THRESHOLD2 |

As shown in TABLE 1, the measurement reports A1, A2, A3, A4, A5, and A6 facilitate inter-frequency and intra-frequency handovers. In contrast, measurement reports B1, and B2 facilitate Inter-Radio Access Technology (Inter-RAT) handovers.

For example, as described in 3GPP TS 36.331, Event A5 is entered when two (2) conditions are fulfilled: (i) the Reference Signal Received Power (RSRP) measurement result of the Primary Cell (PCell) plus hysteresis falls below a first threshold, and (ii) the RSRP measurement result of a neighbor cell (including frequency specific and cell specific offsets) minus the hysteresis increases above a second threshold. Conversely, Event A5 is left when two (2) conditions are fulfilled: (iii) the Reference Signal Received Power (RSRP) measurement result of the Primary Cell (PCell) plus hysteresis exceeds the first threshold, and (ii) the RSRP measurement result of a neighbor cell (including frequency specific and cell specific offsets) minus the hysteresis decreases below the second threshold. In effect, Event A5 is entered/left as the reception quality of the UE's serving cell decreases/increases, and the reception quality of a neighboring cell correspondingly increases/decreases.

Generally, cellular devices automatically select the most capable technology available; thus, a UE that is capable of both LTE and UMTS will select LTE networks when available, and fall back to UMTS networks (which have better coverage) when LTE networks are not available. To this end, the LTE network provides the UE with a RRC Connection Reconfiguration message (rrcConnectionReconfiguration) which includes appropriate measurement configurations and information for the UE (e.g., listings of appropriate cells for measurement, etc., information regarding the listed cells, etc.) when the UE first enters the network (e.g., during an initial handover procedure). Within current UE implementations, the UE validates the rrcConnectionReconfiguration message to ensure that its configuration and information is accurate before completing the handover and connecting to the network.

Existing cellular networks require specific measurement reports for handover operation. For LTE inter-frequency/intra-frequency measurements, the UE must provide measurements for the serving cell, the listed cells, and any detected cells. Additionally, where the UE is UMTS-capable, and UMTS networks exist (inter-RAT UMTS Terrestrial Radio Access (UTRA)), the UE must provide measurements regarding a designated list of cells. If the UE is Global Standards for Mobile Communications (GSM)/Enhanced Data Rates for GSM Evolution (EDGE) (GERAN) capable, and GSM/EDGE networks exist (inter-RAT GERAN), the UE must provide measurements regarding any detected cells. Similarly, if the UE is Code Division Multiple Access (CDMA) 2000 capable, and CDMA 2000 networks exist (inter-RAT CDMA 2000), the UE must provide measurements regarding a designated list of cells.

Unfortunately, experimental and anecdotal evidence has shown that in some cases, the rrcConnectionReconfiguration message is incomplete, malformed (i.e., incorrectly formatted), or otherwise deficient. Incomplete rrcConnectionReconfiguration messages cannot be validated according to the aforementioned cellular network requirements, and result in a Radio Link Failure (RLF), which can abort the connection between the UE and the network. Empirical evidence indicates that many LTE networks do not provide complete information regarding the appropriate inter-RAT technologies (e.g., UMTS, GERAN, CDMA 2000), even where LTE inter-frequency/intra-frequency information is accurate. Moreover, since UEs should preferentially select LTE networks anyway, the RLF does not reflect a problem with the actual LTE handover.

Within this context, various embodiments are directed to correction and recovery of incomplete measurement report configuration messages within an LTE network. More generally, methods and apparatus of the present disclosure are directed to improved schemes for resolving incomplete message content in networks.

Methods—

Figure 2:
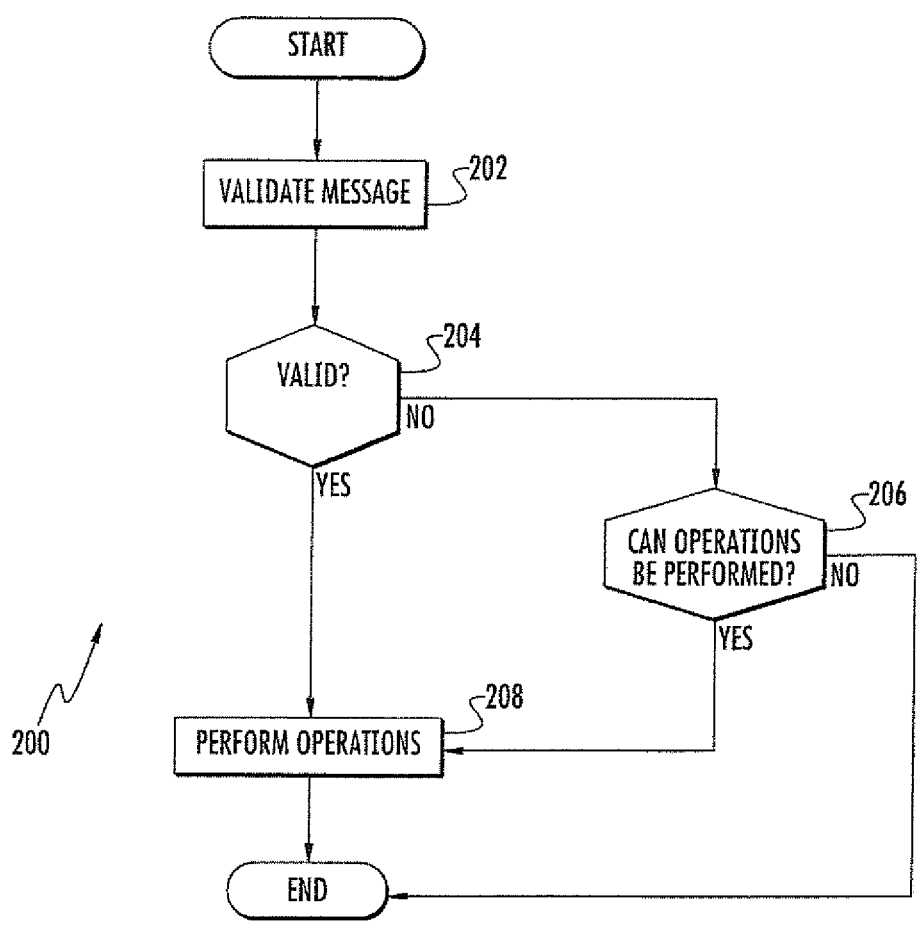
FIG. 2 is a logical flow diagram detailing one embodiment of a generalized method for resolving incomplete message content in networks.

Referring now to FIG. 2, one embodiment of a generalized method 200 for resolving incomplete message content in networks is illustrated. In one scenario, a client device is connected to a first network; during operation, the first network instructs the client device to perform one or more operations according to a message containing at least a first condition relating to a first network, and a second condition relating to one or more other ancillary networks. For example, in one exemplary embodiment, a LTE network instructs a UE to perform LTE inter-frequency/intra-frequency measurements and execute a handover, via an rrcConnectionReconfiguration message, where the rrcConnectionReconfiguration includes event conditions for the LTE network, and ancillary information relating to one or more other inter-RAT networks (e.g., UMTS, GERAN, CDMA 2000, etc.).

At step 202 of the method 200, the client device validates the message. In one embodiment, message validation includes an initial check of one or more portions of the message. Common elements present within the message include: conditional information, execution information (regarding an operation to be performed), control information, and ancillary information, etc. In one exemplary implementation, the message is an rrcConnectionReconfiguration message, which includes one or more portions which identify updated conditional events for measurement reporting for use within a target cell, and an instruction to perform an inter-frequency/intra-frequency handover to the target cell (as well as other ancillary information which is not directly related to the inter-frequency/intra-frequency handover of interest).

In one variant, the validation check may be based on message completeness. For example, where a message includes multiple distinct portions, the client device may determine if each distinct portion is present. In one such case, the rrcConnectionReconfiguration is expected to include a listing of one or more cells of ancillary networks which a mobile device is to measure once the device has completed the handover. If the message lacks the listing of these ancillary networks, then the mobile device will flag an incomplete message. Similarly, the message may identify the ancillary networks, but lack particular or necessary details such as: scrambling codes (e.g., a primary or secondary scrambling code, etc.), resource information (e.g., frequency bands, time slots, etc.), identification (e.g., cell ID, etc.), etc.

In another variant, the validation check may be based on message content. In certain embodiments, the mobile device can ascertain from the content of the message that the information is incorrect (e.g., based on known values, particular properties of the message (e.g., missing fields, improper field length, etc.)). For example, the network operator may incorrectly configure the message content, such as to implement message content according to proprietary (non-standardized) messaging protocols. In such scenarios, the mobile device flags inappropriate content when detected.

In still other variants, the verification includes determining if the prescribed operation complies with expected protocols. For example, in one exemplary embodiment, the UE verifies that the rrcConnectionReconfiguration message correctly indicates inter-frequency/intra-frequency handover operation, or inter-RAT handover in reference to the handover context (e.g., receiving an inter-frequency/intra-frequency handover when an inter-RAT handover is appropriate is flagged as an error).

In an alternate embodiment, message validation may include a check of one or more checksum elements for one or more portions of the message. Common examples of checksum elements include e.g., parity bits, cyclic redundancy checks (CRC), etc. In still other embodiments message validation may include checks for various security certificates, authorizations, etc.

At step 204 of the method 200, if the message is valid, the client device performs the one or more operations specified within the message (step 208). In one exemplary embodiment, an LTE UE that identifies a proper rrcConnectionReconfiguration message updates its appropriate configuration settings, and executes the handover according to existing protocols.

If the message is invalid, then the client device determines if the one or more operations can be performed (step 206).

In one implementation, the client device determines if it can ignore the message deficiency (e.g., malformed content, incomplete content, incorrect content, etc.), and if so performs the appropriate operation (step 208).

In alternate implementations, the client device determines if it can correct message deficiencies based on other information. In certain cases, the client device may intelligently glean the information from other signaling (e.g., broadcast control information from the target cell, broadcast control information from the serving cell, etc.).

Alternatively, the client device may substitute information from historical data. In still other approaches, the client device may substitute reasonable approximation information, or in some cases, default values. In one such case, the client device may substitute null information.

Once the necessary information is reconstructed, the client device can perform the appropriate operation (step 208).

Otherwise, if the client device cannot recover the information, then the client device exits, and optionally flags a validation error.

Example Operation #1

Figure 3:
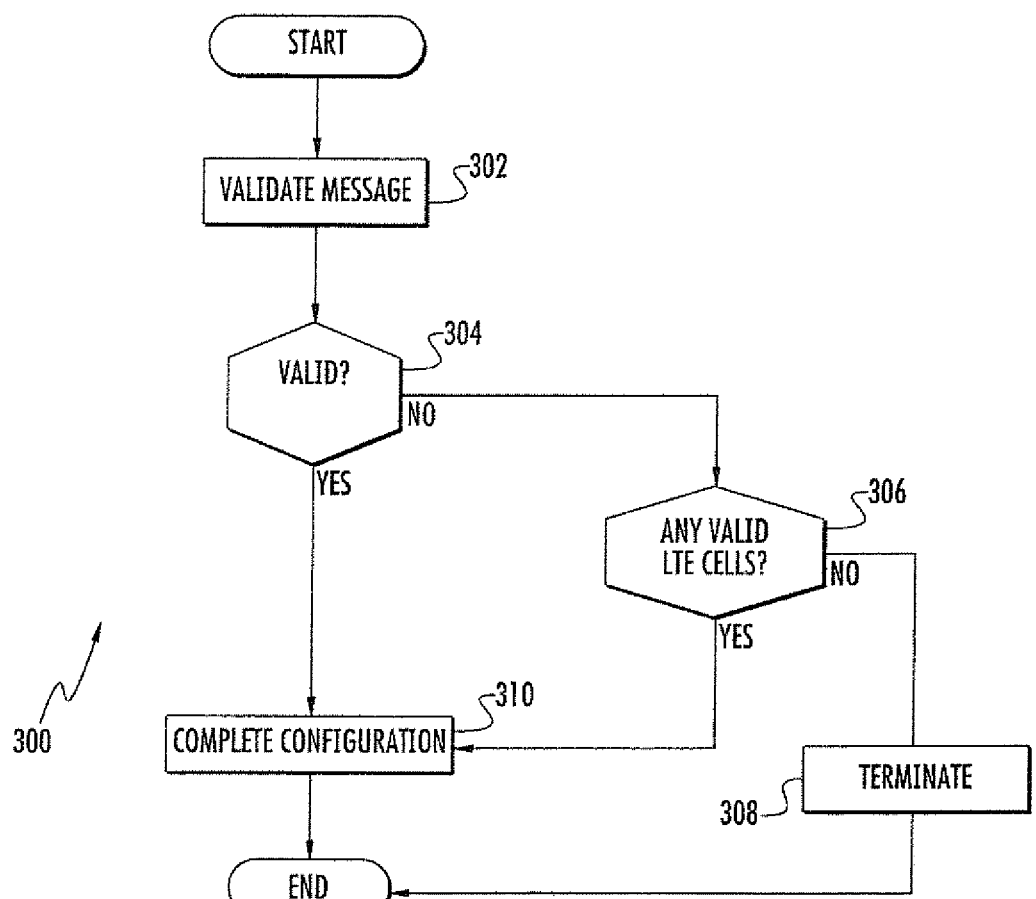
FIG. 3 is a logical flow diagram detailing a first exemplary method for mitigating incomplete messaging.

Referring now to FIG. 3, a first exemplary embodiment of a method 300 for mitigating incomplete messaging is illustrated. Consider the aforementioned scenario where a LTE network instructs a UE to perform LTE inter-frequency/intra-frequency measurements according to an rrcConnectionReconfiguration message, and responsively execute an inter-frequency/intra-frequency handover.

At step 302 of the method 300, the UE validates the rrcConnectionReconfiguration message. Specifically, the UE checks the rrcConnectionReconfiguration message for one or more measurement report conditions. The rrcConnectionReconfiguration message specifies measurements for the LTE serving cell, the listed LTE cells, and any detected LTE cells. In the exemplary case of an inter-RAT UTRA capable mobile, the rrcConnectionReconfiguration message should additionally include a designated list of inter-RAT UTRA cells. If the inter-RAT UTRA cell list is complete (i.e., the list is not empty, and has correct information) then the message is valid. It will be appreciated, however, that other alternative (or complementary) criteria for ascertaining validity may be used consistent with the principles described herein.

At step 304 of the method 200, if the rrcConnectionReconfiguration message is valid, then the UE updates the one or more measurement report conditions, and skips to step 310.

If the rrcConnectionReconfiguration message is invalid, then the UE determines if there is any valid LTE cell detected or listed within the rrcConnectionReconfiguration message (step 306). If there is a valid LTE cell present (either detected or listed), then the UE continues to configure LTE inter-frequency/intra-frequency measurement conditions (i.e., the UE does not immediately trigger a radio link failure (RLF)). In effect, while the UE may not have appropriate information to perform an inter-RAT operation, the UE does have sufficient information to complete the inter-frequency/intra-frequency handover.

If there is no valid LTE cell present, then rrcConnectionReconfiguration message fails validation, and the method terminates (step 308); otherwise, at step 310, the UE completes the configuration process and performs the LTE handover.

Example Operation #2

Figure 4:
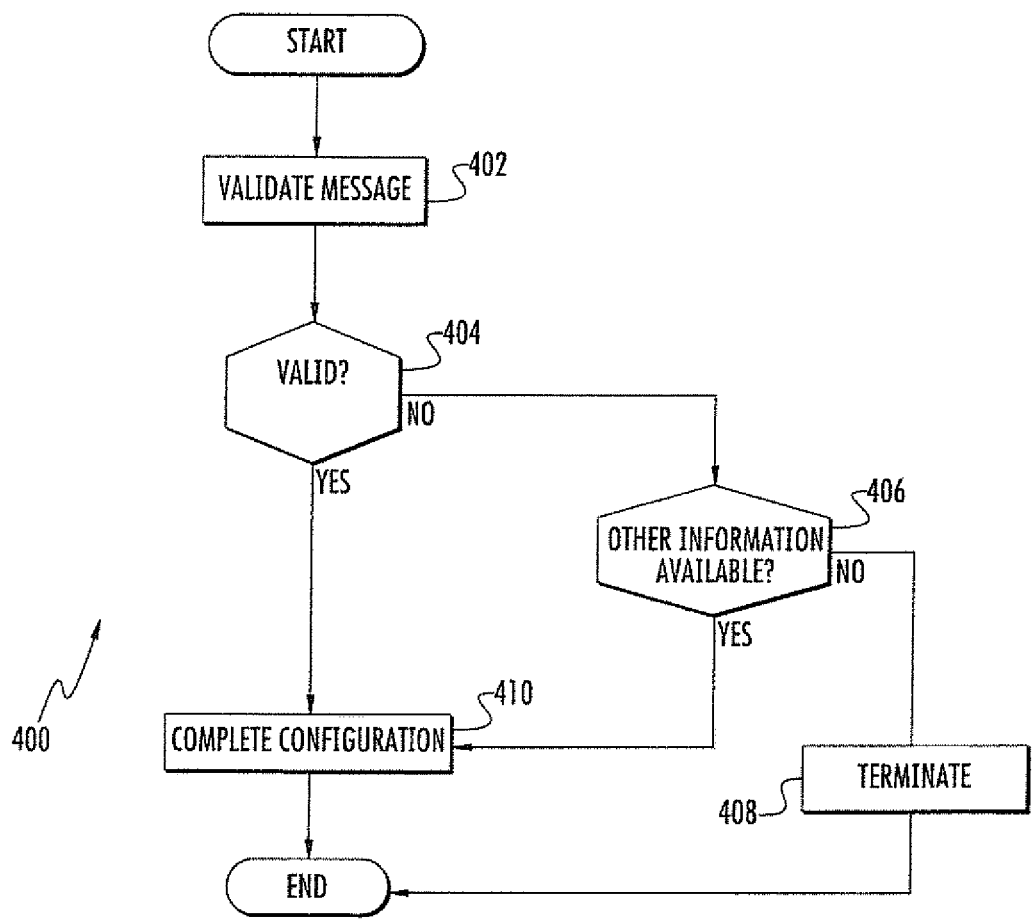
FIG. 4 is a logical flow diagram detailing a second exemplary method for mitigating incomplete messaging.

Referring now to FIG. 4, a second exemplary embodiment of a method 400 for mitigating incomplete messaging is illustrated. As before, the second exemplary method is described in reference to the aforementioned scenario where a LTE network instructs a UE to perform LTE inter-frequency/intra-frequency measurements according to an rrcConnectionReconfiguration message, and responsively execute an inter-frequency/intra-frequency handover.

At step 402 of the method 400, the UE validates the rrcConnectionReconfiguration message. Specifically, the UE checks the rrcConnectionReconfiguration message for one or more measurement report conditions. For example, an inter-RAT UTRA capable mobile should additionally receive information of a designated list of inter-RAT UTRA cells. If the inter-RAT UTRA cell list is complete (i.e., the list is not empty, and has correct information) then the message is valid, and the UE updates the one or more measurement report conditions, and skips to step 410.

If the rrcConnectionReconfiguration message is invalid, then the UE determines if sufficient information can be substituted from other control messages (step 406). For example, the UE can determine information regarding neighbor cells within system information messages (SIB) that are broadcast by the LTE network (e.g., SIB6). Specifically, in the event that neighbor cells are not listed within the rrcConnectionReconfiguration message, the UE substitutes the cells listed in SIB6 messages.

If no substitute information can be found, then rrcConnectionReconfiguration message fails validation, and the method terminates (step 408).

At step 410, the UE completes the configuration process and completes the LTE inter-frequency handover.

It will be appreciated that while the foregoing embodiments are described primarily in terms of first making a determination of validity of a message, and then failing determination, the message be identified as invalid, other logical sequences or approaches may be used consistent with the principles described herein. For example, an affirmative determination of invalidity may first be performed, such as to screen a message from further processing (or overhead). Such determination may be, for example, accomplished by the presence of a defect or known problem, or the absence of essential information, or the inapplicability of the message (or its contents) to a then-present context or state.

Apparatus—

Figure 5:
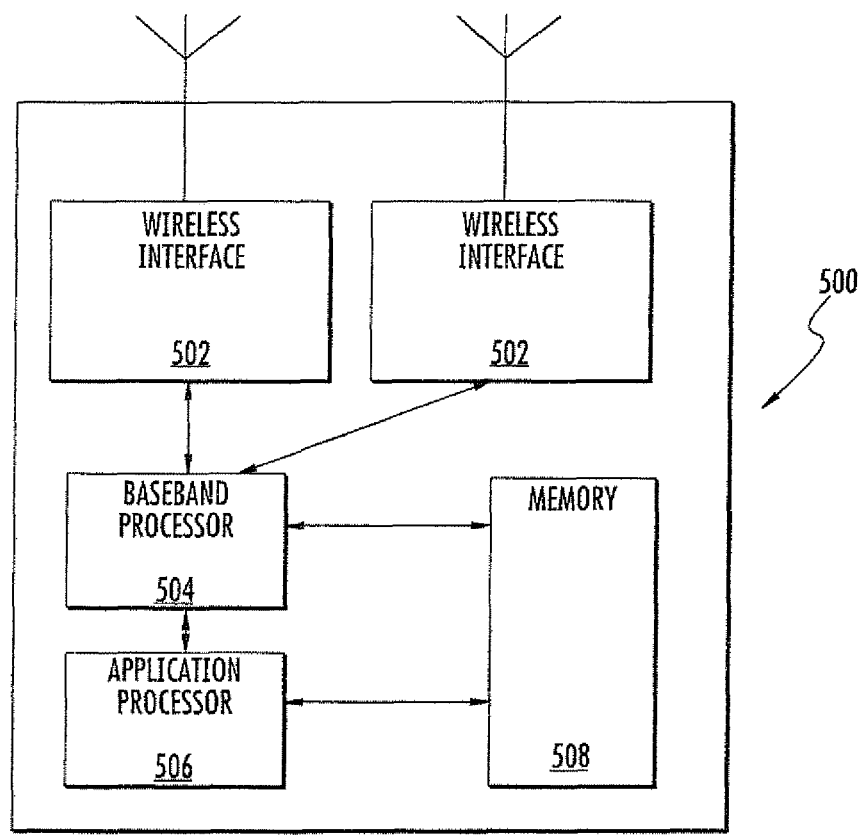
FIG. 5 is a functional block diagram of an exemplary embodiment of a user equipment (UE) apparatus.

Referring now to FIG. 5, one exemplary client device 500 adapted to resolve incomplete message content in networks is illustrated. While one specific device configuration and layout is shown and discussed herein, it is recognized that many other configurations may be readily implemented by one of ordinary skill given the present disclosure, the apparatus 500 of FIG. 5 being merely illustrative of the broader principles of the present disclosure.

The apparatus 500 of FIG. 5 includes one or more modems 502, a baseband processor 504, an applications processor 506 and a computer readable memory subsystem 508.

The baseband processing subsystem 504 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 508, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The baseband processing subsystem 504 is adapted to receive one or more data streams from the one or more modems 502. As shown, the apparatus 500 includes multiple modems: (i) a Long Term Evolution (LTE) modem 502, and (ii) one or more ancillary modems (e.g., Universal Mobile Telecommunications System (UMTS), Global Standards for Mobile Communications (GSM)/Enhanced Data Rates for GSM Evolution (EDGE) (GERAN), Code Division Multiple Access (CDMA) 2000, etc.). Moreover, it is further appreciated that client devices are highly diverse; dual-mode, tri-mode, and quad-mode devices of various configurations are widely available. In fact, the various embodiments are useful in and readily adapted to any multi-mode combination of one or more of the following: GSM, General Radio Packet Service (CPRS), Enhanced Data Rates for GSM Evolution (EDGE), UMTS, LTE, LTE-Advanced (LTE-A), Interim Standard 95 (IS-95), CDMA 2000, CDMA 1 XEV-DO, Time Division Single Carrier CDMA (TD-SCDMA), Time Division LTE (TD LTE), etc.

The application processing subsystem 506 includes one or more of central processing units (CPU) or digital processors, such as a microprocessor, digital signal processor, field-programmable gate array, RISC core, or plurality of processing components mounted on one or more substrates. The application processing subsystem is coupled to computer readable memory 508.

The application processing subsystem 506 is adapted to control overall operation of the device including, for example: multimedia processing, operating system controls, program management, baseband processor configuration and control, etc.

In one exemplary embodiment of the apparatus 500, the memory subsystem additionally includes instructions which when executed by the baseband processor: validates one or more received messages; and when the message is valid, performs the one or more operations described within the received message; and when the message is invalid, determines if the one or more operations can be performed.

In one embodiment, the apparatus includes logic to perform message validation based on one or more portions of the message. Common elements included within the message include: conditional information, execution information (regarding an operation to be performed), control information, and ancillary information, etc.

In other embodiments, the apparatus includes logic configured to verify message completeness. For example where a message includes multiple distinct portions, the client device may determine if each distinct portion is present.

In another variant, the apparatus includes logic configured to ascertain from the content of the message that the information is incorrect (e.g., based on known values, particular properties of the message (e.g., missing fields, improper field length, etc.), etc.). In still other variants, the logic is configured to determine if the prescribed operation complies with expected protocols.

Various embodiments of the apparatus are further configured to ignore message deficiencies (e.g., malformed content, incomplete content, incorrect content, etc.). Alternatively, the apparatus may include logic configured to correct message deficiencies based on other information (e.g., broadcast control information from the target cell, broadcast control information from the serving cell, etc.).

It will be recognized that while certain embodiments are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles and features disclosed and claimed herein.

While the above detailed description has shown, described, and pointed out novel features as applied to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles. The scope of the disclosure should be determined with reference to the claims.

What is claimed is:

1. A mobile wireless apparatus, comprising:
a first wireless interface configured to communicate with at least a first wireless network;
a second wireless interface configured to communicate with a second ancillary wireless network; and
logic in data communication with at least the first wireless interface, the logic configured to cause the mobile wireless apparatus to:
verify the validity of a message by checking completeness and/or content of one or more portions of the message, the one or more portions of the message comprising a first trigger event condition for the first wireless network and a second trigger event condition for the second ancillary wireless network, and one or more operations for the mobile wireless apparatus to perform,
wherein the first and second trigger event conditions each indicate when to perform at least one of the one or more operations;
when the message is valid perform at least one of the one or more operations included in the message; and
when the message is invalid:
verify the validity of the first trigger event condition for the first wireless network by checking completeness and/or content of the first trigger event condition, and
when the first trigger event condition is valid perform at least one of the one or more operations included in the message.

2. The mobile wireless apparatus of claim 1, wherein the one or more portions of the message further comprise (i) target cell information, and (ii) other ancillary wireless network information.

3. The mobile wireless apparatus of claim 1, wherein the first wireless network comprises a long term evolution (LTE) network, and the second trigger event condition for the second ancillary wireless network comprises information for an inter-radio access technology (inter-RAT) handover.

4. The mobile wireless apparatus of claim 3, wherein the one or more operations comprise an LTE inter-frequency or intra-frequency handover operation.

5. The mobile wireless apparatus of claim 1, wherein the logic is configured to further cause the mobile wireless apparatus to reconstruct the first trigger event condition so as to render the first trigger event condition valid when the first trigger event condition is invalid before reconstruction.

6. The mobile wireless apparatus of claim 5, wherein the message is at least in part incorrectly formatted, and reconstruction of the first trigger event condition comprises correcting a format of the message.

7. The mobile wireless apparatus of claim 5, wherein the message is at least in part incomplete, and reconstruction of the first trigger event condition comprises adding missing information from another source to complete at least a portion of the message.

8. The mobile wireless apparatus of claim 7, wherein the message does not contain complete information for one or more neighbor cells, and the another source comprises a system information block (SIB) provided by the first wireless network.

9. The mobile wireless apparatus of claim 7, wherein the message does not contain complete information for one or more neighbor cells, and the another source comprises historical values for the one or more neighbor cells.

10. The mobile wireless apparatus of claim 1, wherein verification of the validity of the message comprises checking one or more checksum elements for the one or more portions of the message.

11. A method, comprising:
by the mobile wireless device:

verifying validity of a message by checking completeness and/or content of one or more portions of the message, the one or more portions of the message comprising a first condition of a first trigger event network for a first wireless network, a second trigger event condition for at least one ancillary wireless network, and one or more operations for the mobile wireless device to perform, wherein the first and second trigger event conditions each indicate when to perform at least one of the one or more operations;

when the message is valid, performing at least one of the one or more operations included in the message; and when the message is invalid:
 determining whether the first trigger event condition for the first wireless network is valid by checking completeness and/or content of the first trigger event condition for the first network; and
 when the first trigger event condition for the first wireless network is valid, performing at least one of the one or more operations included in the message.

12. The method of claim 11, wherein the first wireless network and the at least one ancillary wireless network comprise cellular wireless networks, and the one or more portions of the message further comprise (i) target cell information and/or (ii) other ancillary wireless network information.

13. The method of claim 11, wherein the first wireless network comprises a Long Term Evolution (LTE) network, and the message comprises an rrcConnectionReconfiguration message.

14. The method of claim 13, wherein the one or more operations comprise an LTE inter-frequency or intra-frequency handover operation.

15. The method of claim 11, further comprising:
 when the first trigger event condition for the first wireless network is valid, substituting default information for the second trigger event condition for the at least one other ancillary wireless network.

16. A non-transitory computer-readable medium storing instructions, which when executed by a processor, cause a mobile wireless device to:
 verify validity of a message by checking completeness and/or content of one or more portions of the message, the one or more portions of the message comprising first information for a first network, second information for one or more other networks, and one or more operations for the mobile wireless device to perform,
 wherein the first information for the first network and the second information for the one or more other networks each indicate when to perform at least one of the one or more operations;
 when the message is valid, perform at least one of the one or more operations included in the message; and
 when the message is invalid;
  determine whether the first information for the first network is valid by checking completeness and/or content of the first information for the first network; and
  when the first information for the first network is valid, perform at least one of the one or more operations included in the message.

17. The non-transitory computer-readable medium of claim 16, wherein the non-transitory computer-readable medium comprises a mass storage device of the mobile wireless device.

18. The non-transitory computer-readable medium of claim 17, wherein the one or more operations comprise an inter-frequency or intra-frequency handover operation within the first network.

19. The method of claim 15 further comprising:
 when the first trigger event condition of the first network is invalid, reconstructing the first trigger event condition so as to render the first trigger event condition valid by at least adding missing information from another source to complete at least a portion of the first trigger event condition.

20. A method of operating a mobile wireless device within a first network, the method comprising:
 by the mobile wireless device:
  receiving a message from a network entity of the first network indicating at least one operation to be performed within the first network;
  evaluating the message for completeness by checking one or more portions of the message, the one or more portions of the message comprising at least a first trigger event condition for the first network and one or more operations for the mobile wireless device to perform,
  wherein the first trigger event condition indicates when to perform at least one of the one or more operations;
  when the evaluating indicates that the first trigger event condition included in the message is not complete, invoking at least one reconstruction process to render the first trigger event condition included in the message complete by substituting information for an incomplete portion of the first trigger event condition included in the message; and
  after rendering the message complete, performing at least one of the one or more operations.

* * * * *